No. 831,830. PATENTED SEPT. 25, 1906.
J. P. CLARK.
RAIL BOND.
APPLICATION FILED MAY 27, 1905.

Witnesses:
H. B. Davis.
E. A. Jordan.

Inventor:
John P. Clark,
By Noyes & Harriman
Attys.

UNITED STATES PATENT OFFICE.

JOHN P. CLARK, OF YPSILANTI, MICHIGAN.

RAIL-BOND.

No. 831,830.

Specification of Letters Patent.

Patented Sept. 25, 1906.

Application filed May 27, 1905. Serial No. 262,701.

*To all whom it may concern:*

Be it known that I, JOHN P. CLARK, of Ypsilanti, county of Washtenaw, State of Michigan, have invented an Improvement in Rail-Bonds, of which the following description, in connection with the accompanying drawings, is a specification, like characters on the drawings representing like parts.

This invention relates to rail-bonds of the type designed to be secured to the rail by solder. Heretofore rail-bonds of this type have usually been formed or provided with flat-surfaced terminals or feet adapted to be soldered to flat surfaces formed on the rails; but after a year or two many of the bonds split or peel off of the rails, sometimes one terminal loosening and sometimes both, for as soon as the solder cracks at one end of the soldered connection between the two smooth flat faces the terminal soon peels off. Furthermore, when soldering the usual smooth flat faces together there is a tendency to form air spaces or pockets between the bond-terminal and rail, thus preventing the production of a uniform or uninterrupted or solid contact between the rail and bond. Furthermore, when applying the bond there is a tendency for the solder to run away from the bond when the rail is heated.

My invention has for its object to provide efficient means for overcoming these several objections; and the invention consists in providing the terminal of the rail-bond with a piece of wire-cloth of fine mesh, which is interposed between the terminal and the rail and which so holds the solder as to prevent it from easily cracking and thereby peeling off, and in practice I find that said wire-cloth also prevents the formation of air spaces or pockets when the bond is applied to the rail, and also prevents the solder from running away from the bond when the rail is heated, as it is when the bond is applied. The wire-cloth may be made as a wrapper or covering to inclose or partially inclose the bond-terminal and is held thereon by a binding-wire while the solder is being applied. More than a single layer of wire-cloth may be employed, if desired. When completed, the wire-cloth will be incorporated in the layer of solder on the terminal of the bond. When the bond is applied to the rail in the usual manner, the rail being heated the solder melts, but the layer or layers of wire-cloth will remain incorporated in the solder between the bond and the rail.

Figure 1:
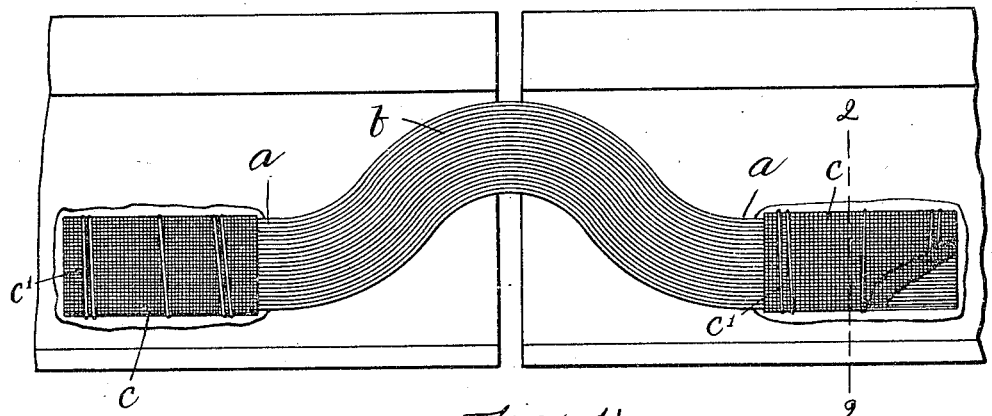
Figure 2:
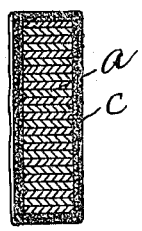
Figure 3:
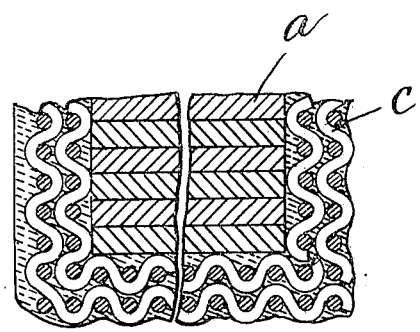

Figure 1 shows in side elevation a rail-bond embodying this invention. Fig. 2 is a vertical section of the bond-terminal, taken on the dotted line 2 2, Fig. 1. Fig. 3 is an enlarged detail of a portion of the bond-terminal.

$a$ represents the terminal of the bond, and $b$ the intermediate portion thereof. The rail-bond is herein shown as composed of several superimposed layers or strips of copper; but so far as my invention is concerned the construction of the rail-bond, as well as its shape or design, is immaterial, so long as it is formed or provided with terminals adapted to be soldered to the rails. A piece or strip of wire-cloth of fine mesh, as $c$, is applied to the bond-terminal $a$. I prefer to employ wire-cloth composed of copper wire. This piece of wire-cloth may be wrapped completely around the terminal and tied with a binding-wire $c'$, as herein shown, or it may be partially wrapped around said terminal, or it may be of such a size as to only cover the under side of said terminal, being held thereon by the binding-wire $c'$; but in any event the wire-cloth will be of a size to include substantially the entire contact-surface between the bond and the rail. The wire-cloth is soldered to the bond-terminal, and sufficient solder is applied to form an especially thick layer on the under side of the bond-terminal, and the wire-cloth becomes embedded or incorporated in the solder, as best shown in Fig. 3. The rail-bond is applied to the rail in the usual manner, and while the rail is heated the solder on the under side of the terminal melts and adheres to the rail. When the bond is secured to the rail, the wire-cloth will be embedded or incorporated in the solder between the bond and rail and will prevent the same from easily cracking and thereby peeling off. By employing a piece of wire-cloth in the manner thus described air spaces or pockets will not form when applying the bond to the rail. Hence a solid contact is produced between the rail and bond. Furthermore, the wire-cloth allows the solder to flow freely, yet restrains it in such a manner as to prevent it from flowing too freely, and thereby running away from the bond when applying the bond to the rail.

Having thus described my invention, what I claim as new, and desire to secure by Letters Patent, is—

1. A rail-bond having a terminal provided with a piece of wire-cloth on its under side, substantially as described.

2. A rail-bond having a terminal provided with a piece of wire-cloth secured to its under side by solder, substantially as described.

3. A rail-bond having a terminal and a piece of wire-cloth wrapped around said terminal, substantially as described.

4. A rail-bond having a terminal and a piece of wire-cloth wrapped around said terminal and secured thereto by solder, substantially as described.

5. A rail-bond having a terminal and a piece of wire-cloth thereon and a binder for holding said wire-cloth in place while solder is being applied, substantially as described.

6. A rail-bond having a terminal adapted to be soldered to the rail and a piece of wire-cloth embedded in the solder between the bond and the rail, substantially as described.

7. A rail-bond having a terminal and a piece of wire-cloth wrapped around said terminal and held thereon by a binding-wire, substantially as described.

In testimony whereof I have signed my name to this specification in the presence of two subscribing witnesses.

JOHN P. CLARK.

Witnesses:
LYMAN B. TRUMBULL,
T. E. BARKWORTH.